G. B. BRAYTON.
PHOTOGRAPHER'S RANGE FINDER.
APPLICATION FILED AUG. 15, 1907.
940,504.
Patented Nov. 16, 1909.
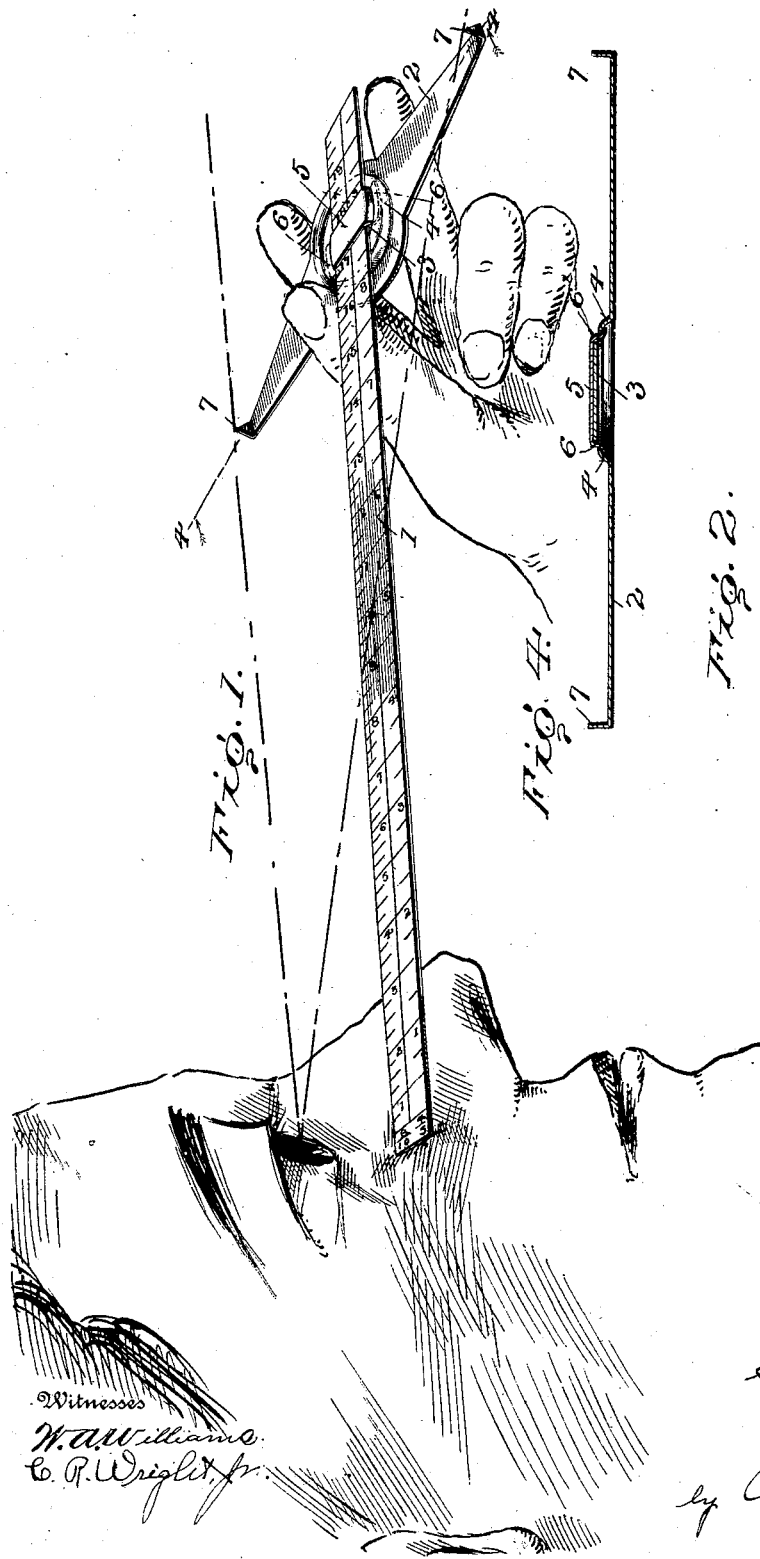
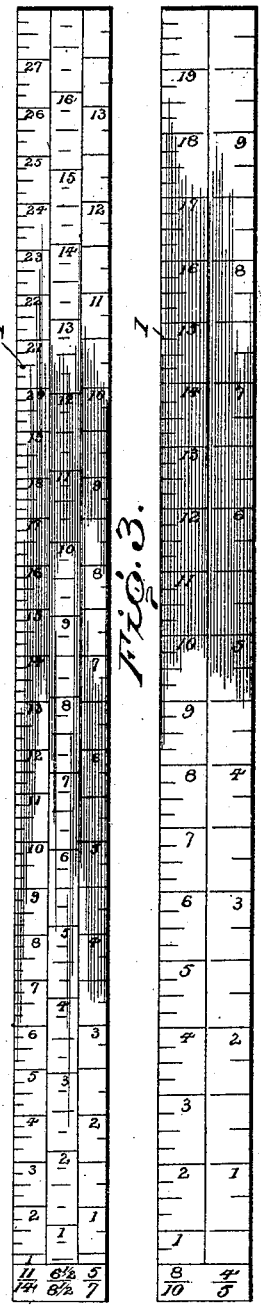
Inventor
George B. Brayton.
by A. S. Pattison
Attorney
Witnesses
W. A. Williams
C. R. Wright Jr.

UNITED STATES PATENT OFFICE.

GEORGE B. BRAYTON, OF BOSTON, MASSACHUSETTS.

PHOTOGRAPHER'S RANGE-FINDER.

940,504.  Specification of Letters Patent.  Patented Nov. 16, 1909.

Application filed August 15, 1907. Serial No. 388,744.

*To all whom it may concern:*

Be it known that I, GEORGE B. BRAYTON, a citizen of the United States, residing at Boston, in the county of Suffolk and State of Massachusetts, have invented certain new and useful Improvements in Photographers' Range-Finders, of which the following is a specification, reference being had therein to the accompanying drawing.

This invention relates to improvements in photographers' rangefinders the objects of which are, (1) to ascertain the distance of the camera from an object to embrace it with a lens of a given focus, (2) to ascertain how much of a subject will be included from a given place, with a lens of a given focus, and (3) to ascertain the focal length of a lens necessary to embrace a certain subject from a given or certain point or place.

Heretofore it has been the practice to accomplish the above results by the tedious and laborious repeated movements of the camera, or the repeated changing of the lens.

The device hereinafter described is to take the place of the camera for ascertaining the facts or results hereinbefore enumerated.

In the accompanying drawings—Figure 1 is a perspective view of a device embodying my invention. Fig. 2 is a top plan view of the scale bar. Fig. 3 is an inverted plan view of Fig. 2. Fig. 4 is a sectional view through Fig. 1 on the line 4—4.

My device consists primarily of two elements; a scale-bar 1, and what may be termed for convenience of description a sight-bar 2. The sight-bar 2 is arranged transversely of the scale-bar, and is longitudinally and rotatively movable upon and in respect to the scale-bar. These movements may be accomplished by various mechanical constructions, any one of which could be embodied within the scope and spirit of my invention. I prefer however to accomplish these movements by providing the sight-bar 2 with a centrally arranged opening 3 having a cup-shaped periphery or wall 4. A plate 5 embraces the scale-bar as shown, and L-shaped ends 6 interlock with the cup shaped wall of the opening 3, as illustrated. By this construction the bar 2 can be moved back and forth on the bar 1, and the bar 2 can be oscillated for the purposes hereinafter explained. The oscillation of the sight-bar is useful when it is pointed upward to get the range of high buildings, and has the same effect as the "swing-back" on good cameras. The swing of the sight-bar is slight, and would not bring the sight points materially nearer the center of the scale-bar.

As shown the scale-bar is provided with a plurality of scale-columns which are located on both sides thereof. These columns stop near one end of the bar as shown, and opposite these columns are placed fractionally arranged numerals which indicate the size of plate represented by the respective columns. For instance the column having the fractionally arranged figures $\frac{8}{10}$ means that that column is divided off and represents a photographer's plate eight by ten inches, and the column having the numeral $\frac{4}{5}$ means that that column represents a plate four by five inches, and so on in respect to the other columns.

The sight-bar 2 is provided at each end with a laterally turned sight projection 7, and in the use of the instrument the operator places his eye at the end of the sight-bar which is marked with the plate sizes, and sights between the sight points 7 in the manner hereinafter explained. I make my device of such size that the sight-points 7 are five inches apart, and in making up the scales of the several columns, the 5 is taken as the numerator, and the length of the plate represented by the respective columns as the denominator, and this fraction is the proportional part of an inch for the markings of the columns. For instance, an 8×10 plate would have markings of $\frac{5}{10}$ of an inch; a 11×14 plate would have markings of $\frac{5}{14}$ of an inch to the inch, etc.

In effecting the first object of the invention referred to in the early part of this description, the photographer has for instance an 8×10 camera, and a lens of 14 inch focus and desires to know where to place the camera to embrace the subject. In this instance the column on the scale-bar for the 8×10 plates is used, and the sight-bar placed thereon at the figure 14 in said column. The instrument is now set to embrace just what the camera will include, and by holding it to the eye, and looking between the sight-points in the sight-bar, the photographer can determine the distance to place the camera from the subject by moving around or back and forth, until the subject is properly sighted or positioned between the sight points. In this case the scale, or numbers thereon does not give the distance of the camera from the subject, but the distance is ascertained (as stated) by sighting down the scale-bar and between the sight points and moving until the proper place or point is found to embrace the subject between the sight points. In carrying out this function of my device it acts the same as the camera, but saves the bother and tedious operation of shifting the camera around from place to place until the proper position is found, which is the usual method employed by professional photographers.

To illustrate the manner of effecting the second object herein mentioned, we will suppose the subject to be a tall building to be photographed on an 8×10 plate with a lens of 6 inch focus. The operator is limited as to distance by the width of the street, and to ascertain whether he can get the building on the plate the sight-bar is set at 6 on the 8×10 column. By sighting down the scale-bar and between the sight points as before explained he can tell at a glance whether the whole building can be included on the plate with the lens which he has. In this instance the oscillating or rotating movement of the sight-bar is useful for it can be turned and maintained in perpendicular position irrespective of the inclination of the sight-bar. The instrument may be used in the same way when desiring to photograph interiors, and by it the scope of the plate and camera or lens can be readily and quickly obtained, as well as the most advantageous point to locate the camera. The turning movement of the sight-bar is also useful in permitting it to be turned parallel or in a line with the scale-bar and thus permit the device to be readily carried in the pocket.

The third object herein mentioned is useful when the photographer for various reasons finds himself confined to but one spot for the camera. By holding the instrument to the eye, and sliding the sight-bar in or out until the subject is properly included or positioned between the sight points, or so much of the same as may be required, the instrument will then indicate the necessary size plate and the focal length of lens necessary. In this way the photographer can ascertain these facts without the camera and thus be able to estimate for a prospective customer the cost of the work, and will avoid the necessity of carrying several lenses and of changing the lens to ascertain which is necessary to include the subject in the manner desired.

The usefulness of the device may be summed up by saying that it takes the place of the camera for the purposes explained, and obviates the necessity of moving the latter around, and the changing of the lens, and in some instances will avoid the necessity of having the camera at all. Professional photographers have many lenses, and they are many times called upon to go to a place and look it over when arranging with a customer. At such a time, it is of great value and a very great convenience to ascertain what instruments and what lens to bring with him to do the work. This little simple device accomplishes this very desirable result.

As here illustrated the scale-bar is meant to include the common sized plates, though it can be readily understood that the scale may be arranged to include either more or less number of plates than that illustrated, and may be made to include different plates. It will be also understood that the scale-bar and sight-bar being detachable, several scale-bars could be provided to cover all of the various sized plates, and used with the single sight-bar, or the scale-bar could be made sufficiently wide to accommodate more columns, and thus include all of the various sizes of plates.

Preferably the device will be made of suitable thin spring metal, though this and other specific features thereof may be varied without departing from the scope and spirit of the invention.

Having thus described my invention, what I claim and desire to secure by Letters Patent, is:—

1. A device of the character described, comprising a scale-bar, and a sight-bar longitudinally adjustable on the scale-bar and arranged transversely thereof and extending therefrom substantially in the plane of the scale-bar.

2. A device of the character described comprising a scale-bar, and a sight-bar movable thereon and having sight-points, the sight-points being fixed and the marking on the slide-bar reckoned for the size of plate by taking the distance between the fixed points as the numerator, and the length of the plate as the denominator the fraction thereof being the proportional part of an inch for the marking.

3. A device of the kind described comprising a scale-bar having markings thereon representing the size of the plate required and the focal length of the lens required for a given subject, and a sight-bar having lateral points at its ends and longitudinally movable on the scale-bar in respect to the said markings to thereby determine the size plate and focal length of lens required.

4. A device of the character described comprising a scale-bar having markings thereon indicating the focal length of the lens, and a sight-bar longitudinally and oscillatably mounted thereon and provided with laterally extending sight-points.

5. A device of the character described, comprising a scale-bar having thereon a plurality of columns each column having markings indicating the focal length of lens for that column and also indicated thereon the size of plate for the respective columns, and a transversely arranged longitudinally movable sight-bar having laterally extending sight-points.

6. A device of the character described, comprising a scale-bar having markings thereon representing the size of plate and also the focal length of lens required for a given subject, and a transversely arranged sight-bar having its ends bent laterally to form fixed sight points, said sight-bar movable longitudinally upon said scale-bar, substantially as and for the purpose described.

7. A folding range-finder comprising a scale-bar, and a sight-bar, said sight-bar being movable longitudinally upon the scale-bar, and connected to be folded parallel the scale-bar for the purpose described.

In testimony whereof I affix my signature in presence of two witnesses.

GEORGE B. BRAYTON.

Witnesses:
B. D. B. BOURNE,
GEORGE E. PUTNAM.